Dec. 1, 1970   MASAMICHI SATO   3,544,458
METHOD OF FILTERING
Filed April 14, 1969

INVENTOR.
MASAMICHI SATO
BY
ATTORNEY

United States Patent Office 3,544,458
Patented Dec. 1, 1970

3,544,458
METHOD OF FILTERING
Masamichi Sato, Asaka-shi, Japan, assignor to Xerox Corporation, Rochester, N.Y., a corporation of New York
Filed Apr. 14, 1969, Ser. No. 815,557
Claims priority, application Japan, May 8, 1968,
43/30,794
Int. Cl. B01d 43/00; F03c 5/00
U.S. Cl. 210—65      10 Claims

ABSTRACT OF THE DISCLOSURE

Process and apparatus for selectively separating particles from mixtures, suspensions and colloidal suspensions by contacting the suspensions with solid particles capable of generating an electrostatic field with the particles and thereby hold them. An application of the invention is in liquid developers and other suspensions utilized in electrophotographic imaging systems.

---

This invention relates to a filtering system and more specifically to the removal of solid particles suspended in an electrically different carrier.

Many systems have been developed in the prior art to separate the components of suspensions. Suspensions are defined as a system having solid particles dispersed in a solid, liquid or gas. A specially classified suspension is called a colloid which has particles too small for resolution with an ordinary light microscope. Although the invention hereinafter described will operate to separate particles of all suspensions, emphasis is placed on colloidal suspensions since they generally present a more difficult separation problem.

Heretofore, removal of colloidal particles has been effected by spontaneous sedimentation, centrifugal sedimentation, filtration with filter paper, electrophoresis and the like. In the case of extremely fine colloidal particles, however, it is not possible to separate or remove the particles by spontaneous sedimentation or centrifugal sedimentation. If filter paper is used, the selection of proper filter paper becomes increasingly more difficult with the decreasing size of particles. If a very fine filter is required, the time of filtration becomes excessive and the filter paper tends to clog. Consequently, it is difficult to filter a large volume of liquid in a short period of time. By contrast, use of electrophoresis permits a large volume of colloidal particles to be separated in a short period of time, even if the particles are of small size. However, the electrophoretic process requires a high-voltage power source and equipment of a large scale.

If the carrier happens to be an inflammable fluid, there is the danger of producing fire because of sparks. This problem would not be uncommon since the carriers used are insulative liquids comprising various kinds of hydrocarbonic solvents.

It is an object of the present invention to readily separate particles even colloidal particles by a relatively simple system. Another object of the invention is to operate safely even for such inflammable insulative liquids as gasoline and kerosene. A further object of the invention is to be a reliable filter irrespective of the size of colloidal particles.

These and other objects of this invention are accomplished by passing a suspension through a layer of solid particles having a greater particle size than that of suspension particles, so that the suspension particles are electrostatically adsorbed by the solid particles on their surface to effect separation of the suspension particles from their carrier.

Figure 1:
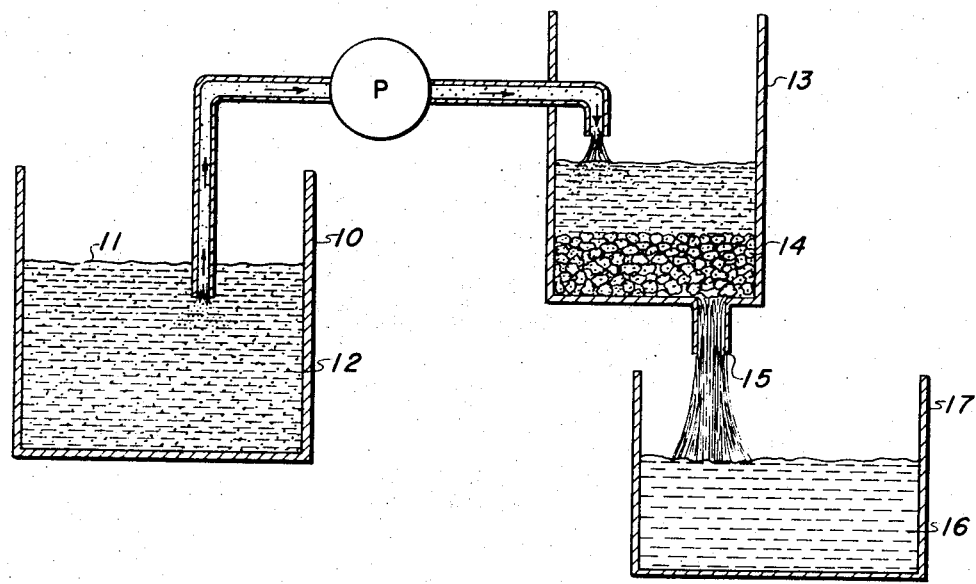
Figure 2:
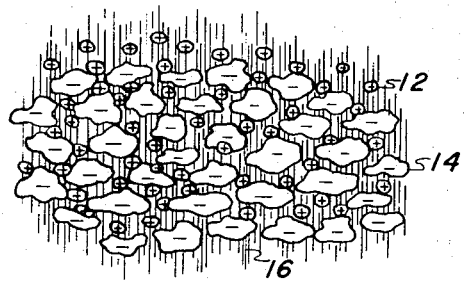

These and other objects and advantages of this invention will become apparent to those skilled in the art after reading the following description taken in conjunction with the accompanying drawings wherein:

FIG. 1 schematically represents a system using the filter mechanism of the invention, and FIG. 2 is a blowup schematic of the suspension particles being electrostatically attracted to and held by filter material particles.

In FIG. 1 a tank 10 is shown holding a suspension 11 having solid particles 12 suspended in a liquid carrier. The suspension 11 is brought to a filter housing 13 by any suitable means such as pump P via conduit 14. Alternatively, a grivity system could be used to bring the suspension to the filter housing 13. Within the housing 13 are several layers of filter material 14 formed as solid particles. There is an egress port 15 through which the liquid carrier 16 passes into a tank 17 which maintains the decontaminated liquid carrier. The suspension particles 12 are attracted to and held by the filter material particles 14 in a manner hereinafter described through the use of electrostatic forces. The filtering system functions on a suspension having a carrier which could be a solid, liquid or gas and an electrically different particle suspended in the carrier such that the charge on the particle is different from that on the carrier. This charge difference may be either positive or negative with respect to the carrier and the carrier may be at a neutral potential having no charge thereon whatsoever. The filter material 14 must acquire a charge opposite to that of the particle when the suspension moves past the filter material. The suspension is passed through a pile of filtering material by any means such as a pump or gravity operating on the suspension or by shaking or jogging the housing holding the filtering material or by any other suitable means to create a flow of the suspension through the filtering material.

FIG. 2 shows a blowup segment of filtering material 14 and solid suspended particles 12 held in a liquid carrier 16 moving past the filtering material. The charge shown on the filter material is negative and the attractive charge on the suspension material would be positive. This causes the suspension particles 12 to be attracted to the filtering material 14 in the particular liquid carrier 16. An example of such a charge relationship would include having a filtering material 14 of polyvinyl chloride particles. If the liquid carrier is mineral oil the surface of the polyvinyl chloride will acquire a negative charge when the mineral oil flows over it. If the solid matter suspended in the mineral oil suspension is glass, it will acquire a positive charge in the mineral oil and will be attracted to the polyvinyl chloride particles 14 as the suspension flows past the particles. In this manner, the glass particles would be removed from the mineral oil allowing the mineral oil, designated 16, to pass through the filter mechanism in a purified state having the glass particles removed therefrom.

It is known that when solid particles are present in a given non-conductive or insulative liquid, the solid particles are charged to either a positive or a negative polarity. For example, when such solid matter as polyvinyl chloride, polyethylene, polyvinylidene chloride, fluoric resin, or nitrocellulose is submerged in a mineral oil, the surface of such solid matter is charged negatively. Such solid matter as protein, polyamide resin, ethylcellulose, or glass is charged positively in a mineral oil. If a solid particle of polyvinyl chloride is submerged in a mineral oil wherein suspended particles are charged positively, then the suspended particles are caused to adhere to the surface of this solid. The mechanism of this phenomenon is such that Coulomb's attraction generated between the negative charge on the surface of polyvinyl chloride and the positive charge of the suspended particles causes the latter to be attracted and deposited on the surface of polyvinyl chloride.

Unlike the principle of filtration by filter paper which serves to impede the passage of suspended particles mechanically, the action of this invention relies on electrostatic attraction of the suspended particles. Accordingly, solid particles (hereinafter referred to as "filtering material") are used for attracting suspended particles. The filtering material preferably has a much greater particle size than the suspended particles. For example, the filtering material may have a particle size of the order of a fraction of a millimeter to several millimeters, while suspended particles may be colloidal having a size of the order of from $0.1\mu$ to $1.0\mu$. These sizes are such that if the suspended particles are not attracted electrostatically, they would pass freely through the spaces between the filtering material.

The filtering material may comprise globular, cylindrical, flat, amorphous, fibrous, or textural shapes and qualities.

Since the principle of this invention is in the electrostatic phenomenon, the charge relationship between the suspended particles and the filtering material is important. Accordingly, if the electric charge on the suspended particles has the like sign with that of the electric charge on the surface of the filtering material, then the surface of the filtering material does not attract suspended particles. In addition, dyes and resins which remain dissolved in an insulative liquid carrier cannot be removed although particles suspended therein can be filtered.

According to this invention, fine particles which are suspended as colloid in such a highly insulative liquid as gasoline or kerosene can be filtered safely and efficiently. However the dye which is dissolved in gasoline for the purpose of coloration will not be removed.

When the surface of the filtering material becomes covered with suspended particles throughout, the electric charge on the surface of the filtering material is replaced by the electric charge of suspended particles and consequently the filtering material will no longer attract more suspended particles of the same kind or charge. To continue the operation of the filter with the same filtering material, the suspended particles can be washed off the filtering material to again expose the surface of the filtering material for further action. Alternatively, a suspension containnig suspended particles of opposite charge to the original suspended particles can be moved through the filter to allow the new kind of suspended particles to adhere to the former suspended particles of opposite charge which are already on the surface. By the latter means, the filtering material can be used repeatedly without being washed.

A particular use for this filtering system is in the field of electrophotography using a developing process called "liquid development" of electrophotographic images. This process utilizes a liquid developer which has colored, "toner" particles suspended in an insulative liquid. After an electrostatic latent image is formed on a sensitive member as, for example, disclosed in Carlson Pat. 2,297,691 or 2,357,809, a visible image can be formed by means of the liquid developer. The sensitive member is cleaned with an insulative liquid called "cleaning liquid" to remove extraneous matter and toner particles not forming the image. Consequentely, the cleaning liquid will become contaminated with charged particles picked up thereby. In order to prevent this, it is necessary to remove such charged particles from within the cleaning liquid. This invention is suitable for this purpose. Also, the invention is suitable for the filtration of the liquid developer which is composed of a solid charged toner particle in an insulative liquid carrier.

It has been found that good filtering results are achieved, especially with colloidal suspensions, if the filtering material is piled to a thickness corresponding to several hundred or even several thousand layers of more of the particles of the filtering material. For example, when glass globules 0.2 mm. across across are used as the filtering material, the layer thickness should exceed several centimeters. As the particle diameter is increased, so should the thickness of the filtering material. In cases where the particle size of the filtering material is as large as several millimeters, it is desirable to incorporate therein another filtering material which has a particle diameter small enough to prevent colloidal particles from passing freely through the opening of the original filtering material.

From the standpoint of operation, the method of this invention may seem similar to the operation of ion-exchangers. But, the two operations are entirely different in principle.

To be specific, the adsorption according to the method of this invention progresses on the colloidal or suspension order, while the removal of ions by means of the ion-exchange resin occurs on the molecular order.

Further, the ion-exchangers are used most advantageously in the form of a column, because the removal of ions takes advantage of the state of equilibrium. This is not necessary with this invention. Whether the filtering material is formed into the shape of a column to allow the liquid to be passed from one end to the other or the filtering material is allowed to stand together with the liquid in a receptacle, the suspended particles are still removed from the carrier.

Another advantage of this invention is that both regeneration and rinsing of the filtering material can be accomplished quite simply by a physical treatment.

The electrophoretic process of purifying soiled substance is based on the same principle as this invention. However, when this process is applied to a liquid having low resistance, it cannot fulfill the object of purification because there is a high possibility of involving electrolysis. By contrast, this invention is free from such worry because it makes use of extremely small electric charge. Furthermore, since the sign of the electric charge is fixed stably by the combination of the material with the liquid, the function of filtration is manifested stable at all times.

It has been demonstrated that this invention can be effected even when the suspended particles are highly electroconductive. In this point, too, this invention differs from the process utilizing the principle of electrophoresis between electrodes.

EXAMPLE I

At the lower end of a bottomless glass cylinder about 10 cm. in inside diameter and about 30 cm. in height, a 200-mesh metal gauze was fastened at the bottom. Glass beads having a particle diameter of about 0.2–0.3 mm. were placed in the cylinder to a height of about 25 cm. Then, a green colloidal liquid having pigment particles of copper phthalocyanine suspended in kerosene was poured from above the receptacle. The liquid which came out of the metal gauze at the bottom of the receptacle was colorless and transparent and contained no pigment at all.

EXAMPLE II

Chips (irregular shape having 0.1 to 1.0 mm. of diameter) cut with a saw from a rigid plate of polyvinyl chloride were cleaned sufficiently with methanol to remove machine oil. Thereafter, they were placed in a receptacle similar to that of Example I. When a colloidal liquid having positively charge zinc oxide 0.05 to 0.5 m$\mu$ in particle diameter suspended in cyclohexane was poured from above, the zinc oxide particles adhered to the surface of polyvinyl chloride chips and colorless transparent cyclohexane containing no zinc oxide flowed out of the metal gauze at the bottom of the receptacle.

EXAMPLE III

The procedures of Example II were followed, except the colloidal liquid suspension used was composed of particles obtained by coating carbon black particles with polyvinyl chloride resin and were suspended in a mineral oil. The colloidal particles were charged negatively. When the colloidal liquid was poured from above the receptacle, the liquid flowing out of the metal gauze at the bottom of the receptacle was found to contain a large volume of colloidal particles. The result suggests that no filtration can be achieved in the case of such combination.

EXAMPLE IV

Oil yellow, which is an oil-soluble dye, was dissolved in a mineral oil. When the resultant solution was passed through the filtering materials of Example I and Example II, the dye concentration in the solution remained unchanged. This suggests that no filtration is obtainable in such case as this.

EXAMPLE V

When the filtration was continued in the procedure of Example II, the entire surface of the filtering material eventually became covered with colloidal particles and, as a consequence, no further filtration could be obtained. Therefore, a colloidal liquid containing particles bound to acquire negative charge in the liquid, for example, the colloidal particles used in Example I, was poured into the receptacle. Consequently, copper phthalocyanine particles deposited themselves on the zinc oxide particles which had already covered the surface of the filtering material, with a result that the new colloidal liquid was filtered completely. This indicates that when the entire surface of the filtering material is covered throughout with one kind of colloidal particles, it is possible to have another kind of colloidal particles deposited thereon, and that this coating can be repeated. According to this procedure, the step of washing off deposited particles can be omitted even when the filtering material becomes covered by colloidal particles throughout.

EXAMPLE VI

In the same receptacle as used in Example I, brass beads 0.2–0.4 mm. in diameter were placed in the lower half portion of the receptacle as the filtering material bound to be charged negatively and glass beads 0.2–0.3 mm. in diameter were placed in the upper half portion as the filtering material bound to be charged positively. By this combination, removal of colloidal particles could be accomplished by passing the liquid through the two layers of filtering material in the receptacle, no matter whether the particles present in the colloidal liquid are charged positively or negatively.

EXAMPLE VII

While two kinds of filtering material were placed in two separate layers in Example VI, they were mixed uniformly and the resultant mixture was placed in the receptacle of Example I. When a colloidal liquid was poured from above, particles contained therein were removed completely without reference to the sign of electric charge of the colloidal particles.

EXAMPLE VIII

In the procedure of Example I, if the layer thickness of glass beads was about 5 cm., the liquid which came out of the layer of filtering material had a slightly green color and was found to contain a small amount of colloidal particles. When the liquid collected was poured from above and allowed to pass through the layer of filtering material once more, the liquid enjoyed perfect filtration this time.

EXAMPLE IX

A colloidal liquid wherein a pigment was suspended, and a small amount of resin was dissolved in a mineral oil was passed through the layers of filtering material of Example VI and Example VII. In this case, only the pigment was removed and the resin remained unremoved.

EXAMPLE X

Even when such comparatively low insulative liquids as ethanol and methanol were used as the dispersant of colloidal particles, there was obtained a similar degree of filtration as in other examples.

No filtration could be achieved when water was used as the carrier.

While this invention has been described with reference to the structures disclosed herein and while certain theories have been expressed to explain the experimentally obtainable results obtained, it is not confined to the details set forth; and this application is intended to cover such modifications or changes as may come within the purposes of the improvements or the scope of the following claims.

What is claimed is:

1. A method for separating solid electrically chargeable particles from the carrier of a suspension including the steps of
    selecting a first suspension;
    providing a filtering material capable of acquiring a surface electrical charge of opposite electrical signal to the particle of the suspension in the presence of the first suspension;
    contacting the filtering material with the suspension;
    electrically attracting the suspended particles to the filtering material with a force sufficient to maintain adsorption of the particles on the filtering material during contact with the suspension;
    covering the surface of the filtering material with the particles of the first suspension;
    selecting a second suspension with particles capable of acquiring an electrical charge opposite to the particles of thet first suspension;
    contacting the covered filtering material with the second suspension thereby electrically attracting the suspended particles of the second suspension to the covered surface of the filtering material.

2. The method of claim 1 wherein the suspension is pumped through the filtering material.

3. The method of claim 1 wherein the suspension is a colloid.

4. The method of claim 1 wherein said filtering material is piled in layers and the contact is with more than one layer of filtering material.

5. The method of claim 1 wherein the filtering material includes particles having a plurality of sizes.

6. A method of separating electrically chargeable particles held in suspension in an electrically insulative carrier including
    providing a particulate filtering material of less than 1 mm. in diameter adapted for acquiring an electrical charge in the presence of the carrier; and moving the suspension through the filtering material such that the particles are electrically attracted to the filtering material with a force sufficient maintain adsorption of the particles on the filtering material during contact with the suspension.

7. The method of claim 6 wherein the filtering material includes particles of approximately between 0.1 and 1 mm. in diameter.

8. A method of separating electrically chargeable particles held in suspension in an electrically insulating carrier including
    providing a first particulate filtering material adapted for acquiring an electrical charge in the presence of the carrier, moving the suspension through the filtering material such that the particles are electrically attracted to the filtering material with a force sufficient to maintain adsorption of the particles on the filtering material during contact with the suspension; and providing a second particulate filtering material adapted for acquiring an electrical charge opposite the first particulate filtering material in the presence of the electrically insulative liquid carrier.

9. The method of claim 8 wherein said first and second particulate filtering materials are in separate layers such that the suspension moves through each sequentially.

10. The method of claim 8 wherein said first and second particulate filtering materials are comingled such that the suspension moves through both simultaneously.

References Cited
UNITED STATES PATENTS 2,549,698  4/1951  Mason  210—243

JAMES L. DE CESARE, Primary Examiner

U.S. Cl. X.R.

210—243, 500